Figures 1, 2:
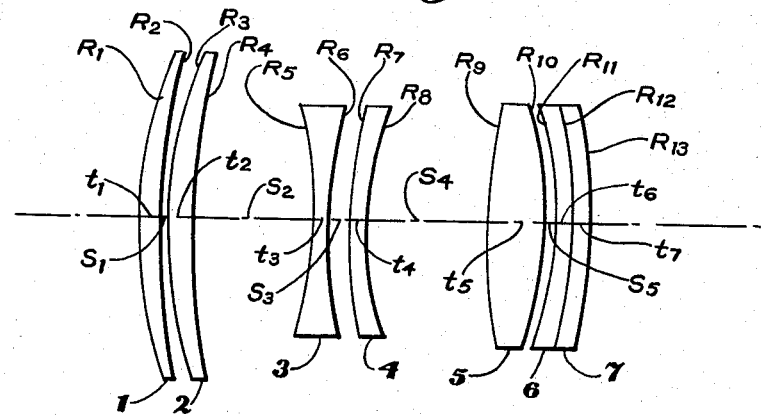

July 31, 1962   M. REISS   3,046,838

SIX-COMPONENT LENS

Filed Nov. 21, 1960

| EQUIVALENT FOCUS 100 mm. | | | | f/3.5 |
|---|---|---|---|---|
| LENS | N | V | RADII | THICKNESSES |
| 1 | 1.7526 | 50.5 | $R_1$= +39.96 mm. | $t_1$= 3.04 mm. |
|  |  |  | $R_2$= +90.02 | $S_1$= 0.32 |
| 2 | 1.7526 | 50.5 | $R_3$= +63.64 | $t_2$= 2.66 |
|  |  |  | $R_4$= +511.4 | $S_2$= 10.60 |
| 3 | 1.7505 | 27.8 | $R_5$= −72.49 | $t_3$= 1.60 |
|  |  |  | $R_6$= +72.49 | $S_3$= 2.08 |
| 4 | 1.7505 | 27.8 | $R_7$= +249.9 | $t_4$= 1.60 |
|  |  |  | $R_8$= +31.91 | $S_4$= 11.54 |
| 5 | 1.7555 | 47.2 | $R_9$= +97.65 | $t_5$= 5.14 |
|  |  |  | $R_{10}$= −28.55 | $S_5$= 0.97 |
| 6 | 1.6119 | 58.7 | $R_{11}$= −28.55 | $t_6$= 1.64 |
|  |  |  | $R_{12}$= −45.95 |  |
| 7 | 1.6170 | 36.7 | $R_{13}$= −61.04 | $t_7$= 1.64 |

Max Reiss
INVENTOR.

BY R. Frank Smith
F. M. Emerson Holmes
ATTORNEYS

United States Patent Office 3,046,838
Patented July 31, 1962

3,046,838
SIX-COMPONENT LENS
Max Reiss, Rochester, N.Y., assignor to Eastman Kodak Company, Rochester, N.Y., a corporation of New Jersey
Filed Nov. 21, 1960, Ser. No. 70,741
2 Claims. (Cl. 88—57)

This invention relates to photographic objective lenses, and particularly to objectives suitable for use in aerial photography. The object of the invention is to provide a highly corrected objective usable at an aperture of $f/3.5$ to cover an angular field of $\pm 7.5°$ with a minimum of aberrations, which at the same time is comparatively inexpensive to manufacture.

The use of coated lens surfaces to reduce internal reflections has made possible the design of lenses having more glass-air surfaces than was formerly practical, thus giving the designer greater freedom of choice of surfaces in minimizing higher-order aberrations and openings up now areas for exploration. This facility has been used extensively in the design of the lens of the present invention. The lens of this invention may be considered as a Tessar type lens in which the middle negative element has been split into two weaker elements, and in which the rear component has been reversed and the two elements separated by an airspace. In a preferred embodiment the front component is also split into two separated elements.

The introduction of the airspace at the interface of the two elements of the rear component, which would ordinarily have a cemented surface at that point, makes possible a great reduction in zonal spherical aberration. The splitting of the front two components in the specific example results in four new elements, each surface of which has a weaker power than the surface from which it was derived, and hence has less spherical aberration.

According to the invention, a 3-component lens is made up in which the front component is positive and consists of one or more positive meniscus lenses, the middle component consists of a biconcave lens and a negative meniscus lens, and the rear component consists of a biconvex lens and a negative meniscus lens, the elements of each component being separated by a comparatively small airspace, the components being separated by two larger approximately equal airspaces. The meniscus element of the middle component is convex toward the biconcave element of the middle component, and the meniscus element of the rear component is concave toward the front of the objective. The over-all length of the objective is between 0.4 and 0.5 times its focal length, and the refractive indices of all glasses in the lens except the rear meniscus element are preferably above 1.70, and the refractive index of the rear meniscus element is preferably below 1.65. These features provide such a high degree of correction that the lens is adequate for aerial photography when made up to operate up to $f/3.5$ in aperture.

The biconcave element of the middle component may conveniently be made equiconcave, that is, having the same radius of curvature on each surface. This construction results in the least curvature at any one surface and makes manufacture of the element easier.

According to a preferred form of the invention, an objective as above described is made up in which the respective radii of curvature R of the lens surfaces and the refractive indices N of the respective lens elements, each numbered by subscripts from front to rear, are within limits shown in this table:

$0.38F < R_1 < 0.42F$
$0.82F < R_2 < 1.0F$
$0.60F < R_3 < 0.68F$
$3.3F < R_4 < 10F$
$-0.78F < R_5 < -0.67F$
$0.67F < R_6 < 0.78F$
$2.0F < R_7 < 3.3F$
$0.30F < R_8 < 0.33F$
$0.89F < R_9 < 1.1F$
$-0.29F < R_{10} < -0.27F$
$-0.29F < R_{11} < -0.27F$
$-0.65F < R_{13} < -0.57F$
$1.70 < N_1 = N_2$
$1.70 < N_3 = N_4$
$1.70 < N_5$
$N_6 < 1.65$

The front of the objective is that end turned toward the longer conjugate distance, the + and − signs indicate surfaces respectively convex and concave toward the front, and F is the equivalent focal length of the objective. $R_{13}$ refers to the rear surface of the lens whether or not there is a cemented surface numbered $R_{12}$.

In the accompanying drawing:
FIGURE 1 is a diagrammatic axial section of an objective according to the invention, and
FIGURE 2 is a table of constructional specifications for a specific embodiment of the invention.

FIGURE 1 shows the front positive component comprising meniscus positive lenses 1 and 2 separated by a small airspace $S_1$, the middle negative component comprising the lenses 3 and 4 separated by a small airspaces $S_3$, and the rear positive component comprising lens elements 5, 6 and 7, elements 5 and 6 being separated by a small airspaces $S_5$. The components are separated by the larger airspaces $S_2$ and $S_4$. A diaphragm or aperture stop may be provided in the airspace $S_4$ if desired. The negative meniscus element of the rear component is shown as consisting of two lens elements 6 and 7 cemented together. This construction is not essential to the invention, but may be used where a glass having the desired combination of index of refraction N and dispersion V is not available, in the following way: If $\phi$ is the power in the rear negative meniscus lens element, and V is the dispersion desired in that element, then $$\frac{\phi}{V} = \frac{\phi_6}{V_6} + \frac{\phi_7}{V_7}$$

where $\phi_6$ and $\phi_7$ are the powers of the cemented elements 6 and 7, respectively, and $V_6$ and $V_7$ are the respective dispersions of those elements. Thus the cemented elements 6 and 7 are equivalent to a single negative meniscus lens element having a power $\phi$ and dispersion V, and if a suitable glass is available, such a single element may be used. In the specific embodiment shown in the table of FIGURE 2, the elements 6 and 7 have substantially the same index of refraction, but the dispersions differ greatly. The resulting combination behaves as an element having the same index of refraction as the two glasses, but an intermediate dispersion. The surface $R_{12}$ has a radius of curvature about halfway between those of $R_{11}$ and $R_{13}$, and because of the small difference of refractive index of the elements 6 and 7, $R_{12}$ makes a negligibly small contribution to the power of the composite lens.

The table of FIGURE 2 is repeated here for convenience.

Table 2

[Equivalent focus 100 mm. f/3.5]

| Lens | N | V | Radii, mm. | Thicknesses, mm. |
|---|---|---|---|---|
| 1 | 1.7526 | 50.5 | $R_1=+39.96$ | $t_1=3.04$ |
|   |        |      | $R_2=+90.02$ | $S_1=0.32$ |
| 2 | 1.7526 | 50.5 | $R_3=+63.64$ | $t_2=2.66$ |
|   |        |      | $R_4=+511.4$ | $S_2=10.60$ |
| 3 | 1.7505 | 27.8 | $R_5=-72.49$ | $t_3=1.60$ |
|   |        |      | $R_6=+72.49$ | $S_3=2.08$ |
| 4 | 1.7505 | 27.8 | $R_7=+249.9$ | $t_4=1.60$ |
|   |        |      | $R_8=+31.91$ | $S_4=11.54$ |
| 5 | 1.7555 | 47.2 | $R_9=+97.65$ | $t_5=5.14$ |
|   |        |      | $R_{10}=-28.55$ | $S_5=0.97$ |
| 6 | 1.6119 | 58.7 | $R_{11}=-28.55$ | $t_6=1.64$ |
|   |        |      | $R_{12}=-45.95$ | $t_7=1.64$ |
| 7 | 1.6170 | 36.7 | $R_{13}=-61.04$ | |

In this table, as in the drawing, the lens elements are numbered in order from front to rear in the first column, the refractive indices N for the D line of the spectrum are given in the second column, the conventional dispersive indices V are given in the third column, the radii of curvature R of the surfaces, the spaces S between the elements, and the thicknesses t, all numbered from front to rear by subscripts, are given in the last two columns. The + and − signs associated with the radii indicate surfaces convex and concave, respectively, to the front of the objective.

The lens given as a specific embodiment of the invention was designed as a taking lens for an aerial camera, to be used with a yellow filter, and is achromatized over the spectral region from 5200 A. to 6600 A.

Having thus described my invention with reference to an example thereof, it is pointed out that the invention is not limited to the example, but is of the scope of the appended claims.

I claim:

1. A three component photographic objective comprising in optical alignment, a front and a rear positive component and a middle negative component, each component comprising at least two elements, in which the radii of curvature R of the optical surfaces and the refractive indices N of the lens elements, each numbered by subscripts from front to rear, are within the following limits:

$$0.38F < R_1 < 0.42F$$
$$0.82F < R_2 < 1.0F$$
$$0.60F < R_3 < 0.68F$$
$$3.3F < R_4 < 10F$$
$$-0.78F < R_5 < -0.67F$$
$$0.67F < R_6 < 0.78F$$
$$2.0F < R_7 < 3.3F$$
$$0.30F < R_8 < 0.33F$$
$$0.89F < R_9 < 1.1F$$
$$-0.29F < R_{10} < -0.27F$$
$$-0.29F < R_{11} < -0.27F$$
$$-0.65F < R_{13} < -0.57F$$
$$1.70 < N_1 = N_2$$
$$1.70 < N_3 = N_4$$
$$1.70 < N_5$$
$$N_6 < 1.65$$

where the front of the objective is that end turned toward the longer conjugate distance, the + and − signs indicate surfaces respectively convex and concave toward the front, and F is the equivalent focal length of the objective.

2. A photographic objective having numerical data substantially as set forth in the following table:

[f/3.5]

| Lens | N | V | Radii | Thickness |
|---|---|---|---|---|
| 1 | 1.753 | 51 | $R_1=+.400F$ | $t_1=.031F$ |
|   |       |    | $R_2=+.900F$ | $S_1=.003F$ |
| 2 | 1.753 | 51 | $R_3=+.636F$ | $t_2=.027F$ |
|   |       |    | $R_4=+.511F$ | $S_2=.106F$ |
| 3 | 1.751 | 28 | $R_5=-.725F$ | $t_3=.016F$ |
|   |       |    | $R_6=+.725F$ | $S_3=.021F$ |
| 4 | 1.751 | 28 | $R_7=+.250F$ | $t_4=.016F$ |
|   |       |    | $R_8=+.319F$ | $S_4=.115F$ |
| 5 | 1.756 | 47 | $R_9=+.977F$ | $t_5=.051F$ |
|   |       |    | $R_{10}=-.286F$ | $S_5=.010F$ |
| 6 | 1.612 | 59 | $R_{11}=-.286F$ | $t_6=.016F$ |
|   |       |    | $R_{12}=-.460F$ | $t_7=.016F$ |
| 7 | 1.617 | 37 | $R_{13}=-.610F$ | | in which the lens elements are numbered in order from front to rear in the first column, the refractive indices N for the D line of the spectrum are given in the second column, the conventional dispersive indices V are given in the third column, the radii of curvature R of the surfaces, the spaces S between the elements, and the thicknesses t, all numbered from front to rear by subscripts, are given in the last two columns and + and − signs associated with the radii indicate surfaces convex and concave, respectively, to the front of the objective and where F is the equivalent focal length of the objective.

References Cited in the file of this patent

UNITED STATES PATENTS 2,298,993    Warmisham _____ Oct. 13, 1942